July 12, 1938.   J. H. GRAYSON   2,123,829
FUEL CONTROL AND REGULATION
Filed Oct. 25, 1935   2 Sheets-Sheet 1
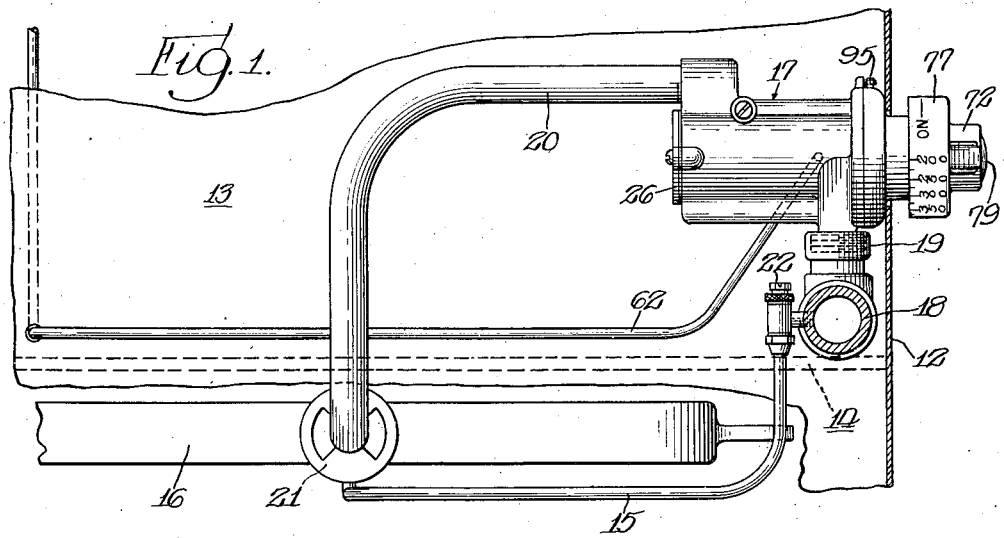
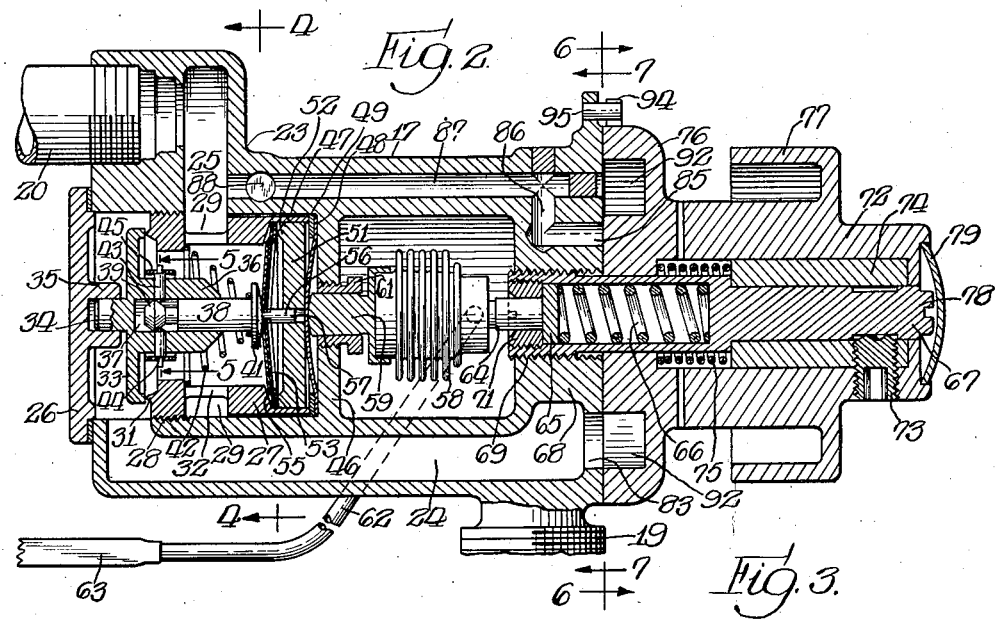
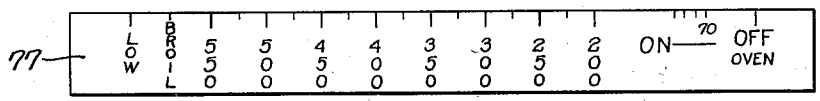
Inventor:—
John H. Grayson,
By Wilson, Dowell, McCanna & Foley Attys.

July 12, 1938.   J. H. GRAYSON   2,123,829
FUEL CONTROL AND REGULATION
Filed Oct. 25, 1935   2 Sheets-Sheet 2
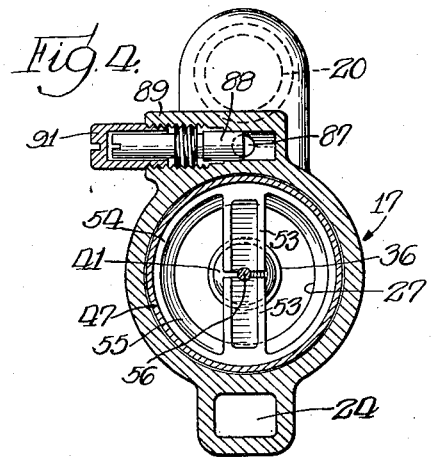
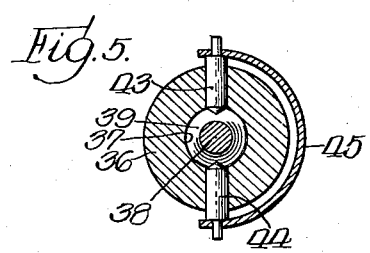
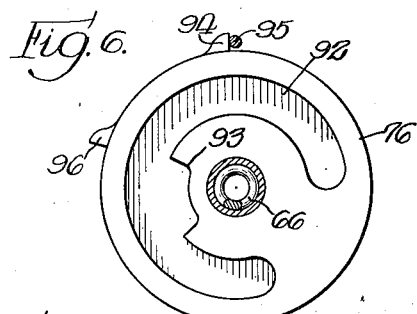
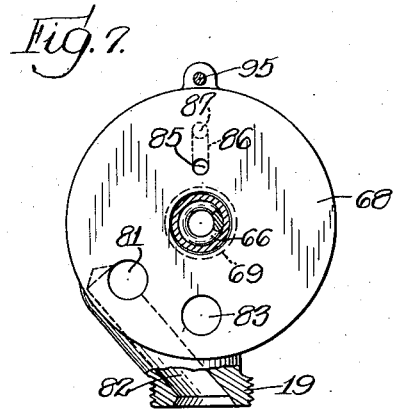
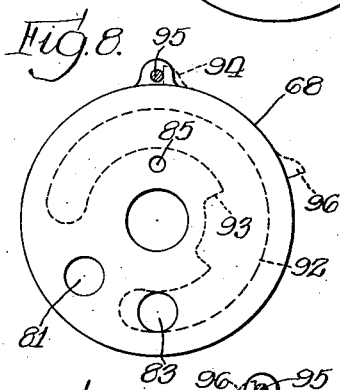
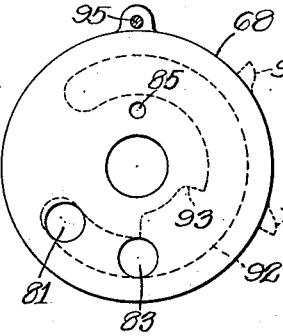
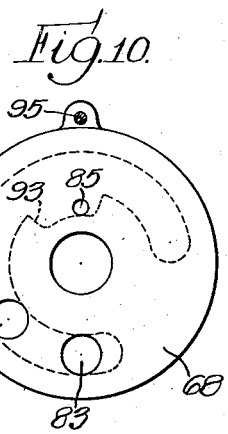
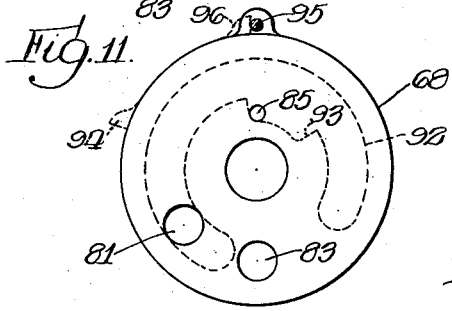
Inventor:-
John H. Grayson,
By Wilson, Dowell, McCanna & Foley Attys.

Patented July 12, 1938

2,123,829

UNITED STATES PATENT OFFICE 2,123,829

FUEL CONTROL AND REGULATION

John H. Grayson, Lynwood, Calif., assignor to Grayson Heat Control, Ltd., Lynwood, Calif., a corporation of California Application October 25, 1935, Serial No. 46,730

8 Claims. (Cl. 236—15)

This invention pertains generally to apparatus for controlling and regulating the fuel supply to one or more burners and, while the principles thereof are capable of embodiment in apparatus suitable for various uses, the form of my invention illustrated as an exemplification of its principles is particularly adapted for gas operated cooking stoves and ranges in which both baking and broiling operations are performed.

Stoves or ranges of this character have heretofore been equipped with a thermostatically controlled oven regulator which serves to regulate the fuel supply to the burner so as to maintain in the oven a predetermined temperature for which the regulator is set. The regulating valve has been of the gradual action type and, in order to prevent extinguishment of the burner when the gas supply is throttled to a very low point by the regulator, a by-pass has been provided to supply the burner with a quantity of gas sufficient to maintain combustion irrespective of the degree of throttling performed by the regulator. This insures a minimum flame at the burner so long as the gas cock remains turned on.

The success of certain baking operations, however, such as the baking of beans, fruit cake, the canning of fruits, etc., require a very low oven temperature, sometimes as low as 225° F. With the employment of a single burner the maintenance of the oven at such a low temperature has practically impossible, because the burning of even the minimum supply of gas by-passed to the burner to prevent extinguishment raises the oven temperature above the requisite low temperature above mentioned. In an effort to overcome this difficulty, burners of the dual type have been devised, one section of which becomes automatically extinguished when the fuel supply reaches a predetermined minimum, thereby permitting the remaining section or sections to burn with a small fuel consumption so as not to undesirably raise the oven temperature. This attempted solution of the problem, however, involves complications in structure and apparatus which increase the installation expense, so that the solution has not been considered entirely satisfactory.

In domestic stoves and ranges the burner which heats the oven is also employed for broiling purposes, the broiling compartment being located beneath the oven and the burner which supplies the heat for both baking and broiling being located in the upper portion of the broiling compartment immediately below the floor of the oven. The broiling is required to be done at a relatively high temperature, sometimes as high, for instance, as 600° F., or more; and often it is desirable to finish the broiling at a much lower temperature. Furthermore, the broiling should proceed continuously and not intermittently. This, of course, necessitates a continuous flame from the burner and has heretofore precluded the employment of a snap action regulating valve for the cooking and broiling burner. In other words, a snap action fuel regulating valve which would produce an intermittent flame at the burner would be suitable, and even desirable, for baking purposes, but would be quite unsuitable and undesirable for broiling purposes. Consequently, the regulating valve controlling the fuel supply to a burner required to perform the dual functions of baking and broiling has necessarily been of the gradual action type.

One of the primary purposes of my present invention is to provide an apparatus for controlling and regulating the fuel supply to a burner, which shall include a snap action valve controlled by an oven thermostat so that when the oven temperature reaches a predetermined maximum for which the regulator is set the fuel supply will be automatically shut off, rendering the burner inoperative until (as the result of a drop of a few degrees in temperature) it is automatically turned on again; furthermore in conjunction with the oven control, the apparatus is so constructed that the burner, when employed for broiling purposes, will produce a continuous flame irrespective of the operation of the oven thermostat.

Through this mode of operation, made possible by my invention, the oven may be operated at very low temperatures, even lower, in fact, than the minimum constant temperature attainable with the minimum flame at which the burner could operate without danger of extinguishment. The burner is, therefore, made most effective for baking purposes, particularly for low temperature baking. At the same time, since the burner delivers a continuous flame when employed for broiling purposes, it is also most effective and desirable for that use; and the disadvantages attendant upon an intermittently operated broiler for broiling purposes are wholly obviated.

As illustrative of one preferred embodiment of my invention which possesses the desirable characteristics above outlined, reference is made to the accompanying drawings, together with the following description, from which the principles of my invention and its inherent advantages (in addition to those broadly mentioned above) should be readily understood and appreciated.

Referring to the drawings:

Fig. 1 is a fragmentary elevation of a broiling compartment and superposed baking oven with my invention applied thereto;

Fig. 2 is a vertical axial sectional view of my novel regulating and control device;

Fig. 3 is a developed view of the regulator knob;

Fig. 4 is a sectional view on the line 4—4 of Fig. 2;

Fig. 5 is a sectional view on the line 5—5 of Fig. 2;

Fig. 6 is a face view of the rotor of the manually operable valve taken on the line 6—6 of Fig. 2;

Fig. 7 is a similar view of the valve stator taken on the line 7—7 of Fig. 2;

Fig. 8 illustrates the relative positions of the valve rotor and stator when the fuel is completely shut off, the stator being shown in full lines and the rotor in dotted lines;

Fig. 9 is a similar view showing the relative positions of the rotor and stator for baking operations;

Fig. 10 is a similar view showing their relative relation for broiling purposes; and Fig. 11 is a similar view showing their position for low temperature broiling purposes.

Referring to the drawings more in detail, reference character 12 indicates the front wall of a stove or range of well known or preferred construction having a baking oven, the side wall 13 of which is next to the cooking top of the stove and a broiling compartment located beneath the oven and separated therefrom by a wall 14 which forms the floor of the oven and the ceiling of the broiling compartment. Immediately beneath the wall 14 is located the burner 16 of the type which directs the flame downwardly and which serves both to heat the oven for baking purposes and to direct an open flame toward the objects to be broiled which are placed in the broiling compartment beneath the burner.

Gas is supplied to the regulator and control device designated generally by 17 from the usual manifold 18 suitably connected as at 19 with the regulator casing. From the regulator the gas is delivered through a pipe 20 to the burner mixer 21 and gas is also supplied from the manifold through a pipe 15 to a constantly burning pilot (not shown) of usual construction located in cooperative relation to the burner 16, the pilot flame being capable of regulation by a manually adjustable valve 22.

The regulator and control device designated generally by 17 comprises an elongated substantially cylindrical casing 23 adapted for connection with the gas inlet and outlet pipes 19 and 20, respectively, and providing a longitudinally disposed supply passage 24 and a radially disposed delivery passage 25 communicating respectively through a hand controlled valve to be later described with said inlets and outlets. Access to the interior of the casing is obtainable through a removable screw fastened cap 26 and in the bore thus rendered accessible there is mounted a cylindrical member 27 screw-threadedly held in position as indicated at 28 and shaped to provide an annular groove 29 registering with the delivery passage 25 and a valve seat 31, communication between the interior of the member 27 and the annular passage 29 being afforded by ports 32.

A fuel control valve 33 is positioned to close against the seat 31, the valve being centered and guided by an extension 34 reciprocable in a guide boss 35 on the inner face of the cap 26. Opening movement of the valve is limited by engagement of the end of the extension 34 with the bottom of the guide opening in the boss. A hub 36 of substantial size extending inwardly from the valve disc is provided with an axial bore 37 within which is reciprocably disposed a stem 38 provided at its outer end with a head 39 serving as a double faced cam 39 which is in the form of two intersecting truncated cores providing a narrow (substantially knife edge) union at their juncture. The inner end of stem 38 is provided with an outwardly convex head 41 to receive the thrust of a coiled expansion spring 42 interposed between this head and the base of the valve seat. This spring normally urges the stem toward the right, viewing Fig. 2.

Connection between the hub of the valve disc and the stem 38 is accomplished through a plurality of pins 43 and 44, respectively (Figs. 2 and 5), which are externally connected and urged toward each other by an arcuate leaf spring 45 so that they yieldably engage with the cam head 39.

It will be obvious that when the stem 38 assumes the position shown in Fig. 2 in which the sharp perimeter of the cam head 39 has moved to the left beyond the centers of the pins 43 and 44, the inward thrust of these pins under the influence of the spring 45 will draw the valve disc 33 against its seat, as shown, thereby shutting off the gas flow through the valve. Likewise, when the stem 38 is permitted to be moved inwardly or to the right by the spring 42, these pins will be forced apart by the cam head until the sharp peripheral edge of the head has passed between the pin centers, whereupon the pins will approach each other along the outer cam surface of the head, thereby moving the disc 33 away from its seat to open the valve and permit gas flow therethrough. A snap action valve is thereby provided in which the movement of the valve disc in each direction is inaugurated by movement of the valve stem in the opposite direction. The valve is, therefore, maintained in either fully open or fully closed position and is instantaneously moved from one position to the other whenever the cam head periphery passes between the pin centers in its movements which are thermostatically induced in a manner which will now be explained.

The body of the casing 23 is shaped as shown in Fig. 2 to provide a transversely extending wall 46 disposed in proximity to the inner end of the cylindrical member 27, the bore of which at said inner end is enlarged, leaving a relatively thin annular wall 47 between the inner end of which and the wall 46 the perimeters of a sealing disc 48 and a gasket 49 are clamped when the member 27 is threaded into position in the casing.

Within the enlarged bore surrounded by the wall 47 there is disposed a reciprocatory pusher member 51 having an annular knife edge 52 spaced inwardly from the perimeter of the member and adapted to actuate a pair of amplifier levers 53 formed integrally with a supporting ring 54, as best shown in Fig. 4. The ring rests at its perimeter against the perimeter of an inclined shoulder 55 formed in the cylindrical member 27, which serves as a fulcrum for the levers 53. When pressure is exerted against these levers 53 by the knife edge 52 the inner ends of the levers will be swung outwardly or to the left, as shown in Fig. 2, thereby moving the stem 38 outwardly to effect the closing of the valve disc 33, as previously explained. Reverse movement of the pusher member 51 to relieve the pressure of the knife edge 52 against the levers will permit them to be restored to normal position by the thrust of the spring 42 in moving the stem 38 inwardly to cause the opening of the valve.

For the purpose of compensating for variations in temperature in the interior of the casing, occasioned by heat from the cooking top burners of the stove or from other sources extraneous to the oven, the levers 53 are preferably made of bimetallic structure, the metal on the faces of the levers opposed to the pusher member having the lesser coefficient of expansion so that, under the influence of heat, the inner ends of the levers will tend to deflect to the right (viewing Fig. 2) from normal, thus compensating for the expansion (by heat extraneous to the oven) of the thermostatic bellows by which the levers are actuated, as will be later described.

In order that the valve stem 38 may be accurately guided in its movements, it is provided at its inner end with a guide pin 56 extending between the opposed ends of the levers 53 and into a guide opening 57 in the pusher member 51.

The thermostatic element, shown as of the bellows type, for operating the pusher member 51 is indicated on the drawings by reference character 58 and, as shown, is provided at one end with a pusher stud 59 guided in a sleeve 61 threaded into the wall 46. The interior of the thermostatic bellows communicates through a capillary tube 62 with a bulb 63 located in the oven, and the bellows, tube and bulb are filled with a suitable liquid which expands upon rise in temperature so that the application of heat to the bulb 63 produces a longitudinal expansion of the bellows member 58, thereby transmitting a thrust through pusher stud 59 to pusher member 51 and thence through the amplifying levers 53 to the valve stem 38. The thermostatic element is shown in Fig. 2 as having expanded sufficiently to close the valve 33.

The thrust exerted by the thermostatic bellows 58 in the opposite direction is transmitted through a stud 64 and disc 65 against a spring 66 located in a bore formed in a shaft 67 having a screw threaded mounting in the end wall 68 of the casing, as indicated at 69. An abutment ring 71 threaded into the open end of the shaft bore serves to retain the spring 66 and cooperating parts in assembled relation. The pressure exerted by the spring 66 is greater than that exerted by the opposed spring 42 and associated parts, so that in normal operation the disc 65 acts as a fixed abutment in opposition to the thrust exerted upon it by the thermostatic bellows 58. In the event, however, that the expansion of the bellows under certain conditions is such as would be likely to exert an injuriously heavy pressure against the levers 53 or other operative parts, the spring 66 will yield under this excessive pressure sufficiently to preclude injury to the parts.

The shaft 67, which is manually rotatable, is threadedly associated with the end wall 68 of the casing, as previously explained, and this threaded connection 69 is preferably of the left-hand thread type so that, when the shaft is rotated in a clockwise direction looking toward the left at Fig. 2, the shaft will be moved to the right or away from the thermostatic bellows 58 so as to relieve the pressure of this bellows against the pusher member 51, thereby permitting the spring 42 to urge the stem 38 to the right, causing the spring 45 in conjunction with the cam head 43 to effect the opening of the valve 33. This rotation of the shaft 67 to the right turns on the gas, in a manner which will be later explained, and the extent of rotative movement of the shaft which regulates the pressure of the stud 64 against the end of the thermostatic bellows determines the temperature at which the valve 33 will be opened and closed by the thermostatic bellows under the influence of the bulb 63 in the oven.

Rotation of the shaft 67 in a clockwise direction to the limit of its movement to shut off the gas supply, as will be later explained, tends to move the stud 64 toward the thermostatic bellows to its extreme position thereby insuring closing of the valve 33. Should, under these conditions, however, the thermostatic bellows be distended by the expansible liquid contained therein, the spring 66 will afford relief against the transmission of excessive pressure by the bellows to the pusher member 51 and thereby preclude injury to the parts. It is to compensate for this condition that the spring 66 is provided.

A manually operable knob 72 is carried by the shaft 67 in position to be manipulated to rotatively adjust the position of the shaft. The knob is secured to the shaft by a set screw 73, and a sleeve 74 interposed between the shaft and the knob serves as an abutment for a spring 75 which urges the rotor member 76 of the gas control and shut-off valve against the cooperative stator member of the valve, which in this instance is the end wall 68 of the casing. The spring 75 insures a tight fit between the opposed faces of the rotor and stator members of the valve irrespective of axial position of shaft 67 resulting from its adjustment by the knob.

The rim 77 of the knob is provided peripherally with visible temperature indications and other data, as will be apparent from the development of this rim shown in Fig. 3. The rotor member 76 is splined or otherwise slidably but non-rotatably secured to the shaft 67 to rotate therewith, and relative adjustment between the rotor and the knob may be made by loosening the knob locking set screw 73 and adjusting the knob angularly with respect to the shaft while the shaft is held stationary. To enable this adjustment a kerf 78 is formed in the end of the shaft and, to preclude tampering and also add to the attractiveness of the assembly, this end of the shaft is covered by a resilient disc 79.

The wall 68 of the casing constituting the stator of the control and shut-off valve is, as will be apparent from Figs. 2 and 7, provided with a port 81 connected with the inlet boss 19 by a diagonally disposed passage 82, with a port 83 communicating with the passage 24 and with a small port 85 communicating through a passage 86 with a longitudinally extending passage 87 opening into the discharge passage 25. The flow of fuel through this passage to maintain a minimum flame in the burner is controlled by a manually adjustable valve 88 (Fig. 4) threaded into a boss 89 of the casing and protected by a removable cap 91. The setting of this valve determines the amount of fuel which will be passed to the burner for minimum flame maintenance.

The rotor 76 of the valve, which is fixed on the shaft 67 as previously explained, is provided on its face with an arcuate groove 92 widened on a relatively short arc to provide a recess 93 extending toward the axis of the rotor. When the knob has been turned to "off" position illustrated in Fig. 8, further movement in that direction is limited by the abutment of a lug 94 on the perimeter of the rotor with a stop pin 95 carried by the stator. In this position the ports 81 and 85 in the stator are cut off so that no fuel may flow through the valve. When the oven is to be used for baking purposes, the knob is turned to the right to establish communication between the ports 81 and 83 through the groove 92, as shown in Fig. 9, and this communication remains established during all settings of the knob between the 200° and 500° ranges indicated on the knob rim. In all of these positions the port 85 remains closed by the rotor.

When the device is to be used for broiling purposes, the knob is adjusted to the point indicated "broil" in which position the rotor will have uncovered the port 85 as shown in Fig. 10 thereby permitting a flow of fuel through the passage 87 in quantities determined by the adjustment of the valve 88. Fuel will accordingly be supplied to the burner continuously through the passage 87 and through the passage 24 under the control of valve 33 which will be either open or closed, depending upon the oven temperature produced. Should this valve be closed by the thermostat, the supply of fuel will be continued through the passage 87 so that a continuous but reduced flame at the burner will be maintained. A continuous flame for broiling purposes is, therefore, always insured, and temperatures in excess of the baking temperatures for which the device is adapted will be maintained. As soon as the temperature drops below the high broiling temperature the valve 33 will be automatically opened by the thermostat and the maximum flame produced by the flow of gas through both ports 83 and 85 will be produced.

In the completion of the broiling operation it is often desirable to finish with a small flame and when this is desired the knob is turned still further to the right to the point indicated by "low" on the knob to bring the parts into the position shown in Fig. 11 in which communication between ports 81 and 83 has been cut off by the rotor but flow of fuel through the port 85 is still permitted. This adjustment enables the production of a low flame to finish the broiling operation. Accidental adjustment of the valve beyond this point is precluded by engagement of an abutment 96 with the stop pin 95, as shown in Fig. 11.

It is believed that the operation of my invention will be understood from the foregoing without further detailed explanation. It may be briefly stated, however, that when the knob is turned to "off" position all flow of fuel to the broiling and baking burner is cut off. When the knob is adjusted to any position within the baking range of temperatures indicated thereon fuel is fed to the burner through the port 83 under the control of the thermostatically actuated snap action valve 33. When the temperature for which the apparatus is set has been reached in the oven, the valve 33 is automatically closed; and when the oven temperature drops a few degrees below the requisite temperature, the valve is automatically opened.

Adjustment of the knob to broiling position causes a delivery of fuel to the burner through both the ports 83 and 85 so that, if the temperature in the oven produced by this flame exceeds that for which the apparatus is set, the valve 33 will automatically close, but the fuel supplied through port 85 will insure the maintenance of a continuous, although low, flame at the burner. For the finishing of the broiling operation the knob is turned still further to the "low" position, thereby shutting off the fuel flow through the port 83 and permitting the burner to continue with a low flame produced by fuel supplied by port 85 only, the size of the flame being determined by adjustment of the valve 88, as previously explained.

The details of construction shown and described are obviously capable of wide modification and variation without departing from the spirit of the invention as defined in the following claims.

I claim:

1. The combination with an oven, a broiling compartment adjacent thereto and a common burner adapted for both baking and broiling purposes disposed in operative relation to said oven and compartment, of means having a plurality of fuel passages for supplying fuel to said burner, said means comprising a thermostatically controlled device in one of said passages for maintaining a predetermined baking temperature in said oven by cutting off the fuel supply when an oven temperature for which said device is set has been reached and turning on the fuel supply when the oven temperature falls below said predetermined temperature, a manually operable valve for controlling the fuel supply to both of said passages, said valve being constructed to supply fuel to both passages simultaneously or to either independently, and a single manually operable means for simultaneously regulating said device and said valve.

2. A fuel control device comprising a casing having a plurality of fuel passages, a snap action valve, a thermostat for actuating said valve, manually operable means for regulating the effective operation of said thermostat so that said valve will be operated thereby at various predetermined temperatures, a second valve for controlling the fuel flow to said passages connected to be operated by said manually operable means and so constructed that upon progressive operation of said manually operable means in one direction fuel will first be supplied only to the passage controlled by said snap action valve, then to both of said passages, and finally to the second of said passages only.

3. The combination with an oven, a broiling compartment, and a common heating burner therefor of a device for controlling the supply of fuel to said burner comprising a casing provided with a plurality of fuel passages therethrough, a snap action valve for closing and opening one of said passages, a thermostat controlled by the oven temperatures produced for actuating said valve, manually operable means for controlling the thermostat so that said valve will be actuated at predetermined oven temperatures only, and a valve arranged to be operated by said manually operable means and comprising passages and shut-off portions so arranged that fuel will be supplied to both or either or neither of said passages, depending upon the setting of said manually operable means.

4. A fuel control device comprising a casing provided with a plurality of fuel passages terminating in a common burner supply passage, a valve for controlling the fuel supply to both of said fuel passages, a thermostatically operable snap action valve for controlling the fuel flow through one of said passages, and a single manually operable means for regulating the operation of said thermostatic valve under the influence of predetermined temperatures and simultaneously adjusting said first-mentioned control valve whereby upon progressive movement of said manually operable means the operation of said thermostatic valve will be retarded and the fuel flow will be admitted first only to the passage containing said thermostatic valve and subsequently to said other passage.

5. The combination with a burner adapted for baking and broiling purposes, of a casing providing a valve seat and a plurality of fuel passages leading from said seat to a common burner supply passage, a thermostatic snap action valve located in one of said passages for controlling the baking temperatures produced by said burner, a control valve cooperating with said casing seat for delivering fuel to said burner through the thermostatic valve passage or through the other of said passages independently of said snap action valve to cause the production of a continuous flame by said burner for broiling purposes, and a common manually operable means for simultaneously adjusting both said thermostatic valve and said control valve whereby upon progressive movement of said means fuel is admitted first through the control valve to the thermostatic valve passage only and subsequently to both of said passages simultaneously.

6. A fuel control device comprising a casing provided with a fuel inlet, a fuel outlet, and a plurality of passages therethrough establishing communication between said inlet and outlet, a snap action valve located in one of said passages, a thermostat including a bellows located in the casing, motion transmitting means interposed between said valve and one end of said bellows, a shaft threaded into and adjustable relatively to the casing, an abutment carried by said shaft in position to be engaged by the other end of said bellows, said abutment being adjustable toward and from the bellows upon rotation of said shaft to thereby regulate the effective action of the bellows upon said motion transmitting means, a rotary valve rotatable with said shaft and provided with passages adapted to control the supply of fuel from said inlet passages to both of said fuel passages in the casing, and means whereby said shaft may be manually manipulated to simultaneously rotate said valve and adjust the position of said abutment to thereby cause the delivery of fuel first to the passage controlled by the snap action valve and then to the other of said casing passages and finally to said other passage only while the effective action of said bellows upon the snap action valve is simultaneously regulated.

7. A fuel control device comprising a casing provided at one end with a valve seat, a plurality of fuel passages in said casing opening at their intake ends through said seat in spaced apart relation and opening at their other ends into a common delivery passage, a snap action valve arranged in said casing to control one of said passages, a thermostat for actuating said valve, manually operable means for regulating the effective operation of said thermostat so that said valve will be operated thereby at predetermined temperatures, a rotary valve cooperating with said seat for controlling the fuel flow to said passages and connected to be operated by said manually operable means, said valve having a seating face cooperable with said seat and provided with a channel arranged to register in certain positions with said passages so that upon progressive movement of said manually operable means in one direction said rotary valve will cause fuel to be first supplied only to the passage controlled by the snap action valve and thereafter to both of said passages and finally to the other of said passages only whereby a supply of fuel will be delivered through said casing at high temperature settings irrespective of the closure of said snap action valve.

8. The combination with an oven, a broiling compartment, a common burner for said oven and compartment, and a fuel supply to the burner including two independent fuel passages, of an oven temperature controlled snap action fuel control valve in one of said passages for maintaining predetermined baking temperatures in said oven, a manually operable valve controlling the fuel supply to both passages, said valve being adapted to supply fuel upon progressive turning movement thereof in one direction, first to the snap action valve passage only, then to both passages, and finally only to said second passage, and manually adjustable means for regulating said snap action control valve and simultaneously adjusting said manually operable valve for causing the delivery of a continuous fuel supply to said burner for broiling purposes when said snap action valve passage is shut off.

JOHN H. GRAYSON.